Dec. 2, 1930.  V. J. BOCKWITZ  1,783,400
GRAIN SAVER
Filed Nov. 19, 1929    3 Sheets-Sheet 2
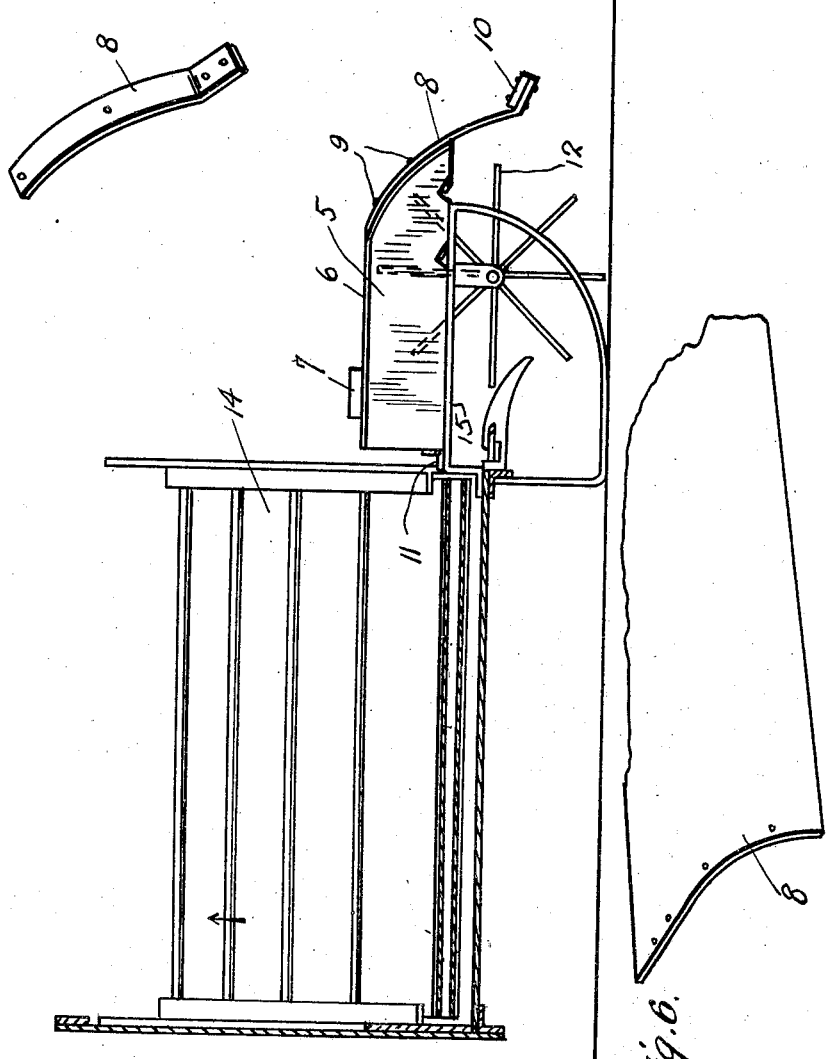
Inventor
V. J. Bockwitz
By Clarence A O'Brien
Attorney Dec. 2, 1930.    V. J. BOCKWITZ    1,783,400
GRAIN SAVER
Filed Nov. 19, 1929    3 Sheets-Sheet 3
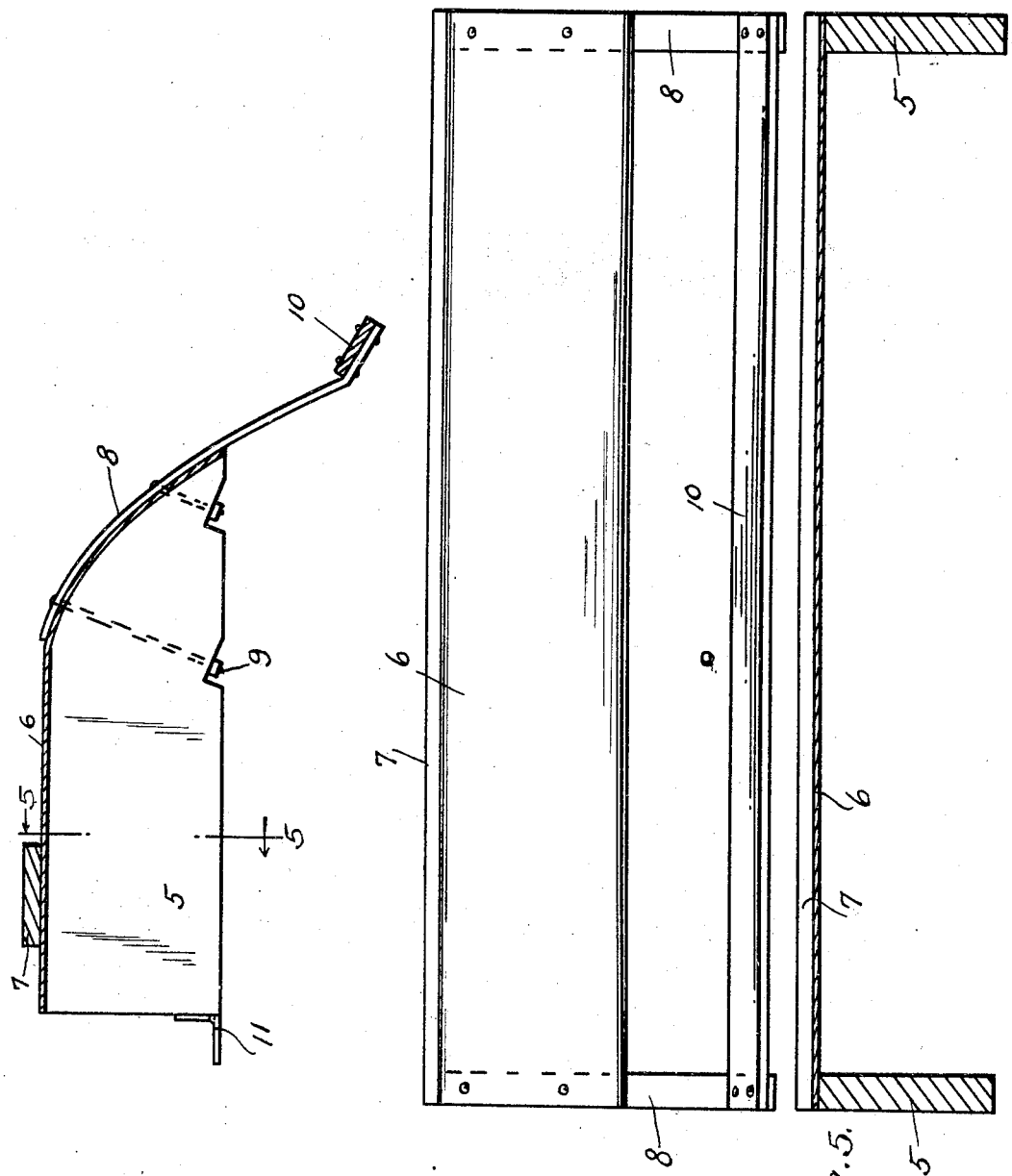
Inventor
V. J. Bockwitz
By Clarence A. O'Brien
Attorney Patented Dec. 2, 1930

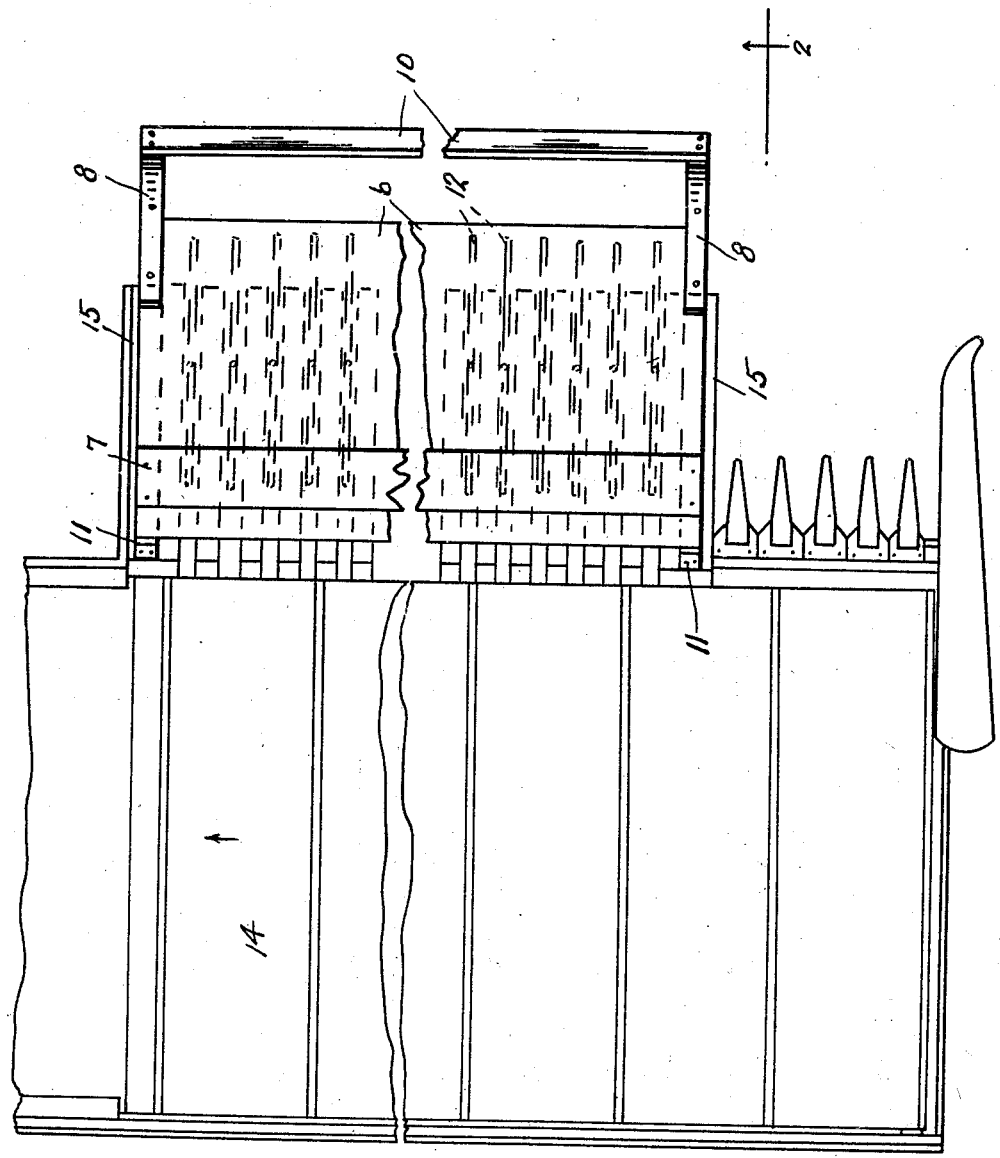

1,783,400

UNITED STATES PATENT OFFICE

VIRGIL JEWELL BOCKWITZ, OF HUMBOLDT, MINNESOTA

GRAIN SAVER

Application filed November 19, 1929. Serial No. 408,340.

The present invention relates to a grain saver and has for its prime object to provide an attachment for windrow pick-ups for the purpose of preventing the waste of grain when the grain is rather short or during windy weather.

Another very important object of the invention resides in the provision of an attachment of this nature which is exceedingly simple in construction, inexpensive to manufacture, strong and durable, easy to apply, and thoroughly efficient and reliable in use.

With the above and numerous other objects in view as will appear as the description proceeds, the invention resides in certain novel features of construction, and in the combination and arrangement of parts as will be hereinafter more fully described and claimed.

In the drawing:

Figure 1 is a top plan view of a windrow pick-up with my improved attachment mounted thereon, Figure 2 is a vertical longitudinal section taken substantially on the line 2—2 of Figure 1, Figure 3 is a longitudinal section taken through the attachment, Figure 4 is a front elevation thereof, Figure 5 is a sectional view taken substantially on the line 5—5 of Figure 4, Figure 6 is a perspective view of the sheet metal hood, and Figure 7 is a perspective view of one of the bracket straps.

Referring to the drawing in detail it will be seen that numerals 5 denote two side plates the forward ends of which have downwardly and forwardly curved edges. A sheet metal hood 8 spans the upper and forward edges of the plates 5. A board 7 is disposed across the sheet 6 adjacent the rear edge thereof. Curved straps 8 are fixed to the plate 6 above the forward curved edges of the plate 6 being bolted in place as indicated at 9 and extend a distance below the bottom edges of the plates 5 and have a bar 10 across the extremities thereof.

Hinges 11 are connected to the bottom portions of the rear edges of the plate 5. As is well known windrow pick-ups are rather wasteful, especially on short straw grain or any other grain on windy days, but with this attachment, the waste of the grain is reduced to a minimum as any grain gotten hold of by the fingers 12 of the windrow pick-up will be delivered upon the platform 14 of the harvester thresher such as is illustrated in the drawings and thus be threshed.

This attachment goes on top of the windrow pick-up and extends ahead of the windrow pick-up with about the same curve of the windrow pick-up, the grain passing between this attachment and the windrow pick-up leaving clearance enough for the grain and straw to pass through and at the same time not allowing the grain or straw to get out of reach of the fingers of the windrow pick-up and therefore is delivered upon the platform harvester pressure without waste after once gotten hold of by the pick-up.

It is thought that the construction, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having this in mind it will be seen that the side plates rest on the frame members 15 of the windrow pick-up and the hinges are bolted thereto and the attachment is ready for use.

Having thus described my invention, what I claim as new is:

1. An attachment of the class described comprising a pair of spaced parallel coextensive side plates, a hood sheet across the side plates, the forward edges of the side plates being curved forwardly and downwardly and the sheet conforming thereto, straps secured to said sheet above the curved edges and extending below the bottom edges of the plate, and a cross bar on the extremities of the straps.

2. An attachment of the class described comprising a pair of spaced parallel coextensive side plates, a hood sheet across the side plates, the forward edges of the side plates being curved forwardly and downwardly and the sheet conforming thereto, straps secured to said sheet above the curved edges and extending below the bottom edges of the plate, and a cross bar on the extremities of the straps, a cross bar across the sheet adjacent the rear edge thereof.

3. An attachment of the class described comprising a pair of spaced parallel coextensive side plates, a hood sheet across the side plates, the forward edges of the side plates being curved forwardly and downwardly and the sheet conforming thereto, straps secured to said sheet above the curved edges and extending below the bottom edges of the plate, and a cross bar on the extremities of the straps, a cross bar across the sheet adjacent the rear edge thereof, and hinges secured to the lower portions of the rear edges of the plates.

4. In combination with a windrow pick-up an attachment therefor, comprising a pair of spaced parallel coextensive side plates, a hood sheet across the side plates, the forward edges of the side plates being curved forwardly and downwardly and the sheet conforming thereto, straps secured to said sheet above the curved edges and extending below the bottom edges of the plate, and a cross bar on the extremities of the straps, a cross bar across the sheet adjacent the rear edge thereof, and hinges secured to the lower portion of the rear edges of the plates, said windrow pick-up comprising side frames and a reel, plates resting on the side frames and rising therefrom, and a hood across the plate.

5. In combination with a windrow pick-up, an attachment therefor, comprising a pair of spaced parallel coextensive side plates, a hood sheet across the side plates, the forward edges of the side plates, being curved forwardly and downwardly and the sheet conforming thereto, straps secured to said sheet above the curved edges and extending below the bottom edges of the plate, and a cross bar on the extremities of the straps, a cross bar across the sheet adjacent the rear edge thereof, and hinges secured to the lower portion of the rear edges of the plates, said windrow pick-up comprising side frames and a reel, plates resting on the side frames and rising therefrom, and a hood across the plate, the forward portions of said hood being curved downwardly and forwardly.

6. In combination with a windrow pick-up, an attachment therefor, comprising a pair of spaced parallel coextensive side plates, a hood sheet across the side plates, the forward edges of the side plates, being curved forwardly and downwardly and the sheet conforming thereto, straps secured to said sheet above the curved edges and extending below the bottom edges of the plate, and a cross bar on the extremities of the straps, a cross bar across the sheet adjacent the rear edge thereof, and hinges secured to the lower portion of the rear edges of the plates, said windrow pick-up comprising side frames and a reel, plates resting on the side frames and rising therefrom, and a hood across the plate, the forward portions of said hood being curved downwardly and forwardly, straps extending from the hood forwardly and downwardly, and a bar across the lower ends of the straps.

In testimony whereof I affix my signature.

VIRGIL JEWELL BOCKWITZ.